United States Patent [19]

Beckwith

[11] Patent Number: 5,005,177
[45] Date of Patent: Apr. 2, 1991

[54] LASER OPTICS QUALITY MONITORING

[75] Inventor: Paul H. Beckwith, Ottawa, Canada

[73] Assignee: Lumonics Inc., Kanata, Canada

[21] Appl. No.: 413,096

[22] Filed: Sep. 27, 1989

[51] Int. Cl.$^5$ .............................................. H01S 3/04
[52] U.S. Cl. ....................................... 372/34; 372/33; 372/99; 372/38
[58] Field of Search ........................ 372/34, 99, 33, 38, 372/92, 107, 108

[56] References Cited

U.S. PATENT DOCUMENTS

| | | | |
|---|---|---|---|
| 4,675,874 | 6/1987 | Pohler et al. | 372/34 |
| 4,730,323 | 3/1988 | Seaton | 372/34 |
| 4,782,492 | 11/1988 | McMahon et al. | 372/34 |
| 4,823,348 | 4/1989 | Hercher | 378/34 |
| 4,876,690 | 10/1989 | Nishida et al. | 373/34 |

OTHER PUBLICATIONS

"Excimer Lasers: Current Trends and Future Directions"—J. Reid, et al—Spie O-Lase'89–Jan. 1989.
"Chemistry Studies Improve Excimer Gas Lifetimes'-'—Laser Focus World, p. 93, Jun. 1989 by G. Jursich, et al.

Primary Examiner—Léon Scott, Jr.

[57] ABSTRACT

This invention describes a method and apparatus that can be used in optic quality monitoring of a gas laser. The method involves measuring the temperature of at least one of the optics in a gas laser, then subtracting the temperature of the laser enclosure from the optic temperature to obtain a temperature differential, and finally dividing the differential by a value proportional to the output power of the laser. The final value, termed "figure of merit", gives a quantitative measure of the condition of the optic. As a result appropriate cleaning and replacement decisions can be made for one or both of the optics in a gas laser.

12 Claims, 1 Drawing Sheet

LASER OPTICS QUALITY MONITORING

FIELD OF THE INVENTION

This invention relates to laser optic quality monitoring.

BACKGROUND OF THE INVENTION

Modern gas lasers are designed to deliver more and more pulse energy at higher and higher repetition rates. Typical power levels now range from 50 W to greater than 150 W. A wide range of applications has arisen for lasers, which require the laser to operate for long periods of time between maintenance.

Gas lasers use a pair of optics (a full mirror at one end and a partial mirror at the other end) to seal the discharge chamber within which the lasing takes place. The output beam is emitted from the partially mirrored optic.

The optics of a gas laser are subject to degradation when used for prolonged periods of time. Also, the gas in the cavity of the laser generates impurities during operation. These impurities ultimately "poison" the laser gas, which must eventually be replaced. This deterioration of the gas may contribute to the degradation of the optics.

The optics are subjected to radiation from the laser beam, and this radiation is particularly intense when the laser is operating in the ultraviolet frequency range, e.g., excimer lasers. Also, in the case of an excimer laser the optics may be attacked by corrosive halogen gases. Nevertheless, basically the same problem of the deterioration of the optics arises at least to some extent in all gas lasers, not only excimer lasers. For example, dust and dirt can find their way onto the inner surfaces of the optics causing etching of such inner surfaces. Also damage centres may form in the bulk of the material. All the factors described above result in an increased absorption of energy by one or both of the optics of any gas laser.

As a result, the reflection and transmission characteristics of the optics decrease with time. Consequently, the output power of the laser is reduced, for which reason one or both of the optics will eventually need to be removed for cleaning or replacement. The interval between cleaning depends upon the operating conditions of the laser, the amount of dust in the laser chamber, and the particular lasing medium employed.

PRIOR ART

Currently, monitoring research has concentrated on gas lifetime analysis. For example, see "Excimer lasers; current trends and future directions", a paper presented at SPIE OE/LASE'89, Los Angeles, January 1989, written by J. Reid, G. Bishop, S. Hastie, B. Norris, R. Weeks, E. Williams and T. Znotins. Also, refer to "Chemistry studies improve excimer gas lifetimes" Laser Focus World pp 93, June 1989, written by G. Jursich, D. Rufin, W. Von Drasek, J. Reid and T. Znotins. These references discuss methods of extending the gas lifetime in lasers.

However, these papers are not concerned with active optic degradation monitoring. Currently, optic components in a laser are routinely checked visually, whether or not the optic has actually suffered any degradation. Maintenance procedures are often made as a matter of routine, as opposed to actual need for replacement or cleaning. This results in wasted time and money due to loss of use of the laser during possibly unnecessary maintenance checks.

SUMMARY OF THE INVENTION

The object of the invention is to provide a method of monitoring the quality of a laser optic while the laser is operating. The method will provide a quantitative measure of optic quality, and hence allow the operator to clean or replace an optic only when required.

The invention is based on an appreciation of the fact that the level of degradation of an optic will be reflected in the temperature of such optic, since the energy that the optic fails to properly transmit or reflect is usually converted into heat.

Accordingly an embodiment of the invention consists of a method of optic quality monitoring of a gas laser having a pair of optics, comprising measuring the temperature of at least one of said optics. It is then possible to observe directly, but preferably using a computer or other monitoring means, when this temperature exceeds a predetermined threshold.

In a more refined method the additional factor of the surrounding temperature of the laser enclosure can be taken into account by subtracting this surrounding temperature from the measured optic temperature to obtain a temperature differential. In this case the monitoring means will observe when this temperature differential exceeds a predetermined threshold.

In a still more refined method the additional factor of the power output of the laser can be taken into account by dividing the temperature differential by a value proportional to the output power of the laser to obtain a "figure of merit" value for the optic under observation. The monitoring means will then observe when this figure of merit value exceeds a predetermined threshold.

The invention also relates to apparatus for use with a gas laser for carrying out these methods, and to the combination of such apparatus and a gas laser.

DESCRIPTION OF THE PREFERRED EMBODIMENT

Figure 1:
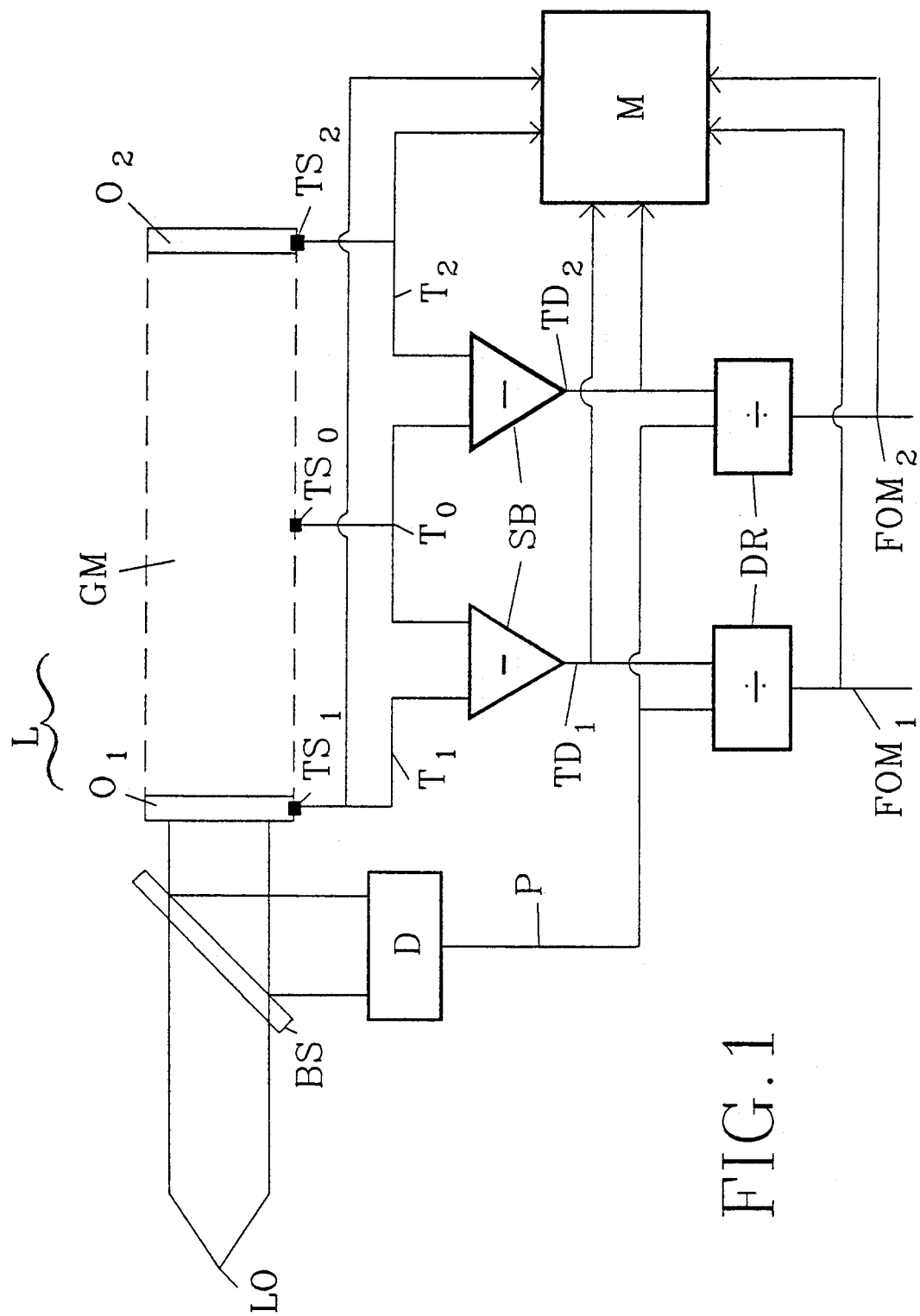
FIG. 1 is a schematic of a device according to an embodiment of the invention for monitoring the conditions of the optics in a gas laser.

This description makes specific reference to an excimer type laser L. However, the quality monitoring system of this invention can also be used on $CO_2$, HF, Cu-vapour and any other high power gas laser with discrete optics.

The laser L has two optics $O_1$ and $O_2$ with a gain medium GM between the two optics. Output LO from the optic $O_1$ is passed through a beam splitter BS which reflects a portion of the output to a power detector D.

As mentioned above there are several mechanisms that can lead to deterioration of the optics $O_1$ and $O_2$. Due to increased absorption of energy in an unacceptably degraded optic, part of the normal output energy of the laser is converted into heat in the optic and causes subsequent heating of the optic mount.

Under normal operating conditions, this heating effect can be substantial; both the optic and its metal mount become significantly hotter than their surroundings. For example, an excimer laser operating with an output power of 50 W will cause a dirty optic and its mount to attain about a 35° C. temperature difference from the surroundings, i.e. the laser enclosure. In contrast, a clean optic and mount are only heated to about 5° C. above the surrounding temperature.

In the method proposed in this invention, a small temperature sensor $TS_1$ is placed in good thermal contact with the mount of the optic $O_1$. Similarly, a temperature sensor $TS_2$ is placed in contact with the mount of the optic $O_2$. A third temperature sensor $TS_0$ monitors the surrounding temperature in the laser enclosure. The difference between the temperature of each optic mount and the surrounds is calculated during operation of the laser. For optic $O_1$, $T_1$ is the temperature of the mount and $T_O$ is the temperature of the surrounds. These temperature readings are passed through a subtractor SB. The difference $TD_1$ is equal to $T_1 - T_O$. For optic $O_2$, $T_2$ is the temperature of the mount and $T_O$ is again the temperature of the surrounds. This second pair of temperature readings is also passed through a subtractor SB. The difference $TD_2$ is equal to $T_2 - T_O$.

To permit even more accurate quantitative comparisons to be made, the measured temperature differentials $TD_1$ and $TD_2$ can be scaled by a value P proportional to the laser output power, as determined by the detector D. The respective temperature differentials $TD_1$ and $TD_2$ are divided, each in a divider DR, by the value P. The final result of the division is termed the "figure of merit" FOM, which is proportional to the optical absorption in each respective optic. Thus, for optic $O_1$ the figure of merit $FOM_1$ is equal to $TD_1/P$, and for optic $O_2$ the figure of merit $FOM_2$ is equal to $TD_2/P$. All of the values mentioned above can be observed directly by an operator or electronically by monitoring means M.

Once one of the figure of merit FOM readings has reached a given threshold value, the operator can decide to clean or replace the optic as required.

Implementation of such a system for monitoring the optical characteristics of the laser has several benefits over the hit-and-miss conventional methods. For example, if the output power of a laser decreases, the present invention enables the user to determine whether it is optic degradation or gas degradation that is at fault. Moreover, the invention indicates whether both or only one of the optics is at fault, since it provides a quantitative report on the quality of each optic individually. The monitoring system can thus provide advance warning of a future need for optic cleaning or replacement, which can then be scheduled at a convenient time.

The monitoring system of this invention will also provide the rate of optic degradation and allow predictions on cleaning intervals to be made. Another advantage is based on the ability to determine when an optic must be replaced. For example, if a freshly cleaned optic continues to show significant absorption, bulk degradation has occurred and the monitoring system of this invention will indicate that it is time to replace the optic.

The additional features discussed above can be determined by entering the figure of merit values FOM into the monitoring means M. This can be a computer, which will use the FOM values to calculate the various rates and maintenance intervals discussed above, based on a predetermined threshold.

As indicated, it is possible to employ a simpler system. For example, by simply monitoring at least one of the temperatures $T_1$ and $T_2$ and passing the readings directly to the monitoring means M, at least some useful information can be obtained on the condition of the optic. Since this approach does not take into account the surrounding temperature or the output power of the laser the results will not be as refined, but may nevertheless be sufficient in some circumstances with some lasers.

Another method would involve taking into account the surrounding temperature $T_O$ of the laser enclosure, but not the power value P, i.e. feeding the respective differentials $TD_1$ and $TD_2$ directly into the monitoring means M to make a decision on the condition of the optics. This method takes into account the general operating temperature of the laser and as a result will yield a more accurate level of degradation information than monitoring only the temperature $T_1$ and/or $T_2$.

I claim:

1. A method of monitoring optical quality of optical means of a gas laser having a pair of optical means, the method comprising:
   measuring a temperature of at least one of a pair of optical means of a gas laser;
   measuring a surrounding temperature of an enclosure for the laser; and
   subtracting said surrounding temperature from the measured temperature of said optical means to obtain a corresponding temperature differential thereby enabling monitoring of said optical means.

2. A method according to claim 1, including the step of observing when said temperature differential exceeds a predetermined threshold.

3. A method according to claim 1, including the step of dividing said temperature differential by a value proportional to an output power of the laser to obtain a corresponding figure of merit value.

4. A method according to claim 3, including the step of observing when said figure of merit value exceeds a predetermined threshold.

5. An apparatus for monitoring optical quality of optical means of a gas laser having a pair of optical means, said apparatus comprising:
   a first temperature sensor for measuring a temperature of at least one of a pair of optical means of a gas laser;
   a second temperature sensor for measuring a surrounding temperature of an enclosure for the laser; and
   means for subtracting said surrounding temperature from the measured temperature of said optical means to obtain a corresponding temperature differential thereby enabling monitoring of said optical means.

6. An apparatus according to claim 5, including monitoring means for comparing said temperature differential with a predetermined threshold.

7. An apparatus according to claim 5, including means for detecting a value proportional to an output power of the laser; and
   means for dividing said temperature differential by said value to obtain a corresponding figure of merit value.

8. An apparatus according to claim 7, including monitoring means for comparing said figure of merit value with a predetermined threshold.

9. The combination of:
   a gas laser having a pair of optical means;
   a first temperature sensor for measuring a temperature of at least one of said optical means;

a second temperature sensor for measuring a surrounding temperature of an enclosure for the laser; and means for subtracting said surrounding temperature from the measured temperature of said optical means to obtain a corresponding differential temperature to enable monitoring of said optical means.

10. The combination of claim 9, including monitoring means for comparing said temperature differential with a predetermined threshold.

11. The combination of claim 9, including means for detecting a value proportional to a power of the laser, and means for dividing said temperature differential by said value to obtain a corresponding figure of merit value.

12. The combination of claim 11, including monitoring means for comparing said figure of merit value with a predetermined threshold.

* * * * *